United States Patent
Rasanen

(10) Patent No.: US 11,005,741 B2
(45) Date of Patent: May 11, 2021

(54) CONTROL OF COMMUNICATION WITH EXTERNAL APPLICATION

(71) Applicant: NOKIA SOLUTIONS AND NETWORKS OY, Espoo (FI)

(72) Inventor: John Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 628 days.

(21) Appl. No.: 15/523,090

(22) PCT Filed: Oct. 31, 2014

(86) PCT No.: PCT/EP2014/073474
§ 371 (c)(1),
(2) Date: Apr. 28, 2017

(87) PCT Pub. No.: WO2016/066222
PCT Pub. Date: May 6, 2016

(65) Prior Publication Data
US 2017/0317904 A1    Nov. 2, 2017

(51) Int. Cl.
*G06F 15/173* (2006.01)
*H04L 12/26* (2006.01)
(Continued)

(52) U.S. Cl.
CPC ...... *H04L 43/0817* (2013.01); *H04L 47/2475* (2013.01); *H04W 28/0205* (2013.01); *H04W 28/0215* (2013.01); *H04W 28/0263* (2013.01)

(58) Field of Classification Search
CPC .......... H04L 43/0817; H04W 28/0205; H04W 28/0215; H04W 28/0263
See application file for complete search history.

(56) References Cited

U.S. PATENT DOCUMENTS 4,659,733 A * 4/1987 DuPriest .............. C07D 339/08
514/436
4,755,528 A * 7/1988 DuPriest .............. C07D 339/08
514/436
(Continued)

OTHER PUBLICATIONS

European Office Action application No. 14 793 519.1-1215, dated Mar. 14, 2019.
(Continued)

*Primary Examiner* — Thanh T Nguyen
(74) *Attorney, Agent, or Firm* — Squire Patton Boggs (US) LLP

(57) ABSTRACT

An apparatus including at least one processing circuitry, and at least one memory for storing instructions to be executed by the processing circuitry, wherein the at least one memory and the instructions are configured to, with the at least one processing circuitry, cause the apparatus at least: to determine an abnormal operation of an external application with which at least one communication element has established a communication connection; to decide on a change of an uplink traffic to the external application; and to selectively control a communication of the at least one communication element to the external application by providing control information for the at least one communication element, the control information reflecting the decision to change the uplink traffic to the external application.

28 Claims, 7 Drawing Sheets

(51) Int. Cl.
*H04W 28/02* (2009.01)
*H04L 12/859* (2013.01)

(56) References Cited

U.S. PATENT DOCUMENTS

| | | | | |
|---|---|---|---|---|
| 9,633,381 B2* | 4/2017 | McKerlich | ............. | G06Q 40/00 |
| 9,853,861 B2* | 12/2017 | Mazhar | ............... | H04L 41/5054 |
| 9,984,428 B2* | 5/2018 | Doyle | ..................... | G06F 16/34 |
| 2005/0002886 A1* | 1/2005 | Philippe | ................... | A61K 8/46 |
| | | | | 424/70.5 |
| 2013/0211055 A1* | 8/2013 | Raines | ................... | C07K 1/113 |
| | | | | 530/408 |
| 2013/0290537 A1 | 10/2013 | Shaw | | |

OTHER PUBLICATIONS

Communication pursuant to Article 94(3) EPC dated Oct. 2, 2020 corresponding to European Patent Application No. 14793519.1.
Communication pursuant to Article 94(3) EPC issued in corresponding European Patent Application No. 14 793 519.1, dated Feb. 26, 2020.
Intel Corporation, S1-143251, Activation and Control of CATS when a Third Party Server Supports Multiple Applications, 3GPP TSG-SA WG Meeting #67, 2014.
NEC, S2-132821, Rapporteurs proposal for restructuring TR 23.705, SA WG2 Meeting #S2-98, 2013 (revision of S2-132433).
Telecom Italia, S2-132450, Enhancement of TFT filters, SA WG2 Meeting #98, 2013 (revision of S2-13xxxx).
3GPP TR 22.853 V1.0.0 (Feb. 2014); 3rd Generation Partnership Project; Technical Specification Group Services and System Aspects; Study on Service Exposure and Enablement Support (SEES) Requirements (Release 13).
NTT Docomo, S1-141523, WID proposal for Application specific Congestion control for Data Communication (ACDC); 3GPP TSG-SA WG1 Meeting #66, 2014.
KDDI, 51-141579, New WID for Feasibility Study on Control of Applications when Third party Servers encounter difficulties; 3GPP TSG-SA WG1 Meeting #66, 2014.
Intel, S2-141718, Correction to AESE WID timelines; SA WG2 Meeting #103, 2014.
Intel, S2-142076, AESE TR Scope, SA WG2 Meeting #103, 2014.
Alcatel-Lucent, S2-142082, AESE Architecture; SA WG2 Meeting #102, 2014 (revision of S2-141587).
Intel et al, S2-142222, Key issue—Service Capability Exposure Framework; SA WG2 Meeting #103, 2014.
Huawei, S2-142224, Proposed Service Capability Exposure Framework Model; SA WG2 Meeting #103, 2014.
International Search Report and Written Opinion international application No. PCT/EP2014/073474 dated Jul. 15, 2015.

* cited by examiner

CONTROL OF COMMUNICATION WITH EXTERNAL APPLICATION

BACKGROUND

Field

The present invention relates to apparatuses, methods, systems, computer programs, computer program products and computer-readable media usable for controlling a communication with an external application.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partnership Project
ACDC: application specific congestion control for data communication
ADC: application detection and control
AESE: architecture enhancements for service capability
API: application programming interface
AS: application server
BS: base station
CATS: control of applications when third party servers encounter difficulties
CN: core network
CPU: central processing unit
D2D: device to device
DL: downlink
eNB: evolved node B
ETSI: European Telecommunications Standards Institute
GGSN: gateway GPRS support node
GPRS: general packet radio service
GW: gateway
HTTP: hypertext transfer protocol
IP: Internet protocol
IP-CAN: IP connectivity access network
LTE: Long Term Evolution
LTE-A: LTE Advanced
OMA: open mobile alliance
PCC: policy control and charging
PCEF: policy and charging enforcement function
PCRF: policy and charging rules function
P-GW: packet data network gateway
SCF: service capability function
SDF: service data flow
SEES: service exposure and enablement support
TDF: traffic detection function
TFT: traffic flow template
UE: user equipment
UL: uplink
VNF: virtual network function Embodiments of the present invention are related to a communication system in which a suitable architecture, procedure and protocol are provided with regard to a functionality allowing a suitable control of a communication to an external application in case a problem, i.e. an abnormal operation of the external application (and/or an AS controlling the application) is recognized.

SUMMARY

According to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to determine an abnormal operation of an external application with which at least one communication element has established a communication connection; to decide on a change of an uplink traffic to the external application; and to selectively control a communication of the at least one communication element to the external application by providing control information for the at least one communication element, the control information reflecting the decision to change the uplink traffic to the external application.

Furthermore, according to an example of an embodiment, there is provided, for example a method including determining an abnormal operation of an external application with which at least one communication element has established a communication connection; deciding on a change of an uplink traffic to the external application; and controlling selectively a communication of the at least one communication element to the external application by providing control information for the at least one communication element, the control information reflecting the decision to change the uplink traffic to the external application.

According to further refinements, these examples may include one or more of the following features:
the abnormal operation of the external application may be determined by at least one of receiving and processing an indication from the external application or a third party server controlling the application indicating a problem at the external application side, and detecting, from a communication monitoring, a performance of operation of the external application and judging an abnormal operation of the external application from the detection result;
the abnormal operation of the external application may include at least one of a congestion state, an overload situation, a crash of an application and a crash of a third party server controlling the external application, wherein the abnormal operation of the external application may cause at least one of a delayed response time, a missing response from the external application, and a retransmission of a request;
the change of the uplink traffic to the external application may include a temporary limitation or stop of the uplink communication from the at least one communication element to the external application;
for selectively controlling the communication of the at least one communication element, specific capabilities of the at least one communication element may be considered;
for selectively controlling the communication of the at least one communication element, at least one of a suspension mechanism and a code processing mechanism may be used, wherein the control information provided to the at least one communication element may include an indication to the communication element to suspend or stop a specific part of the uplink communication related to the external application;

for selectively controlling the communication of the at least one communication element, an implementation of at least one filter for preventing uplink traffic related to the external application may be used, wherein the control information provided to the at least one communication element may include a setting or removing of at least one filter related to relevant bearers between the at least one communication element and the external application;

for using an implementation of at least one filter for preventing uplink traffic related to the external application, at least one of whether or not a filter is already applied on a relevant bearer, and of whether or not other traffic being different to the traffic between the at least one communication element and the external application is communicated on the relevant bearer may be considered;

in case there is no filter applied on the relevant bearer and the other traffic is communicated on the relevant bearer, for selectively controlling the communication of the at least one communication element, at least one uplink filter related to the other traffic may be set;

in case there is no filter applied on the relevant bearer and no other traffic is communicated on the relevant bearer, for selectively controlling the communication of the at least one communication element, at least one uplink filter which fulfills formal requirements but leads to no destination may be set;

in case there is no filter applied on the relevant bearer and no other traffic is communicated on the relevant bearer, for selectively controlling the communication of the at least one communication element, a complete blocking filter may be set;

in case there is no filter applied on the relevant bearer, for selectively controlling the communication of the at least one communication element, at least one specific blocking filter for blocking at least one specified service data flow related to the external application may be set;

in case there is at least one filter applied on the relevant bearer, for selectively controlling the communication of the at least one communication element, the at least one filter related to the external application may be removed;

the filter may include a traffic flow template filter;

for selectively controlling the communication of the at least one communication element, a control of an internal application of the at least one communication element which communicates with the external application may be used for preventing uplink traffic related to the external application, wherein the control information provided to the at least one communication element may include an indication to stop or suspend of the internal application of the at least one communication element;

in case the at least one communication element having established a communication connection with the external application includes more than one communication element, it may be recognized whether or not a prioritizing of the communication elements is set, and an order of communication elements may be considered based on the prioritizing when deciding on a change of an uplink traffic to the external application and selectively controlling the communication of the communication elements;

it may be determined that the abnormal operation of the external application with which the at least one communication element has established a communication connection is terminated, it may be decided on a reset of the uplink traffic to the external application; and the communication of the at least one communication element to the external application may be selectively controlled by providing control information for the at least one communication element, the control information reflecting the decision to reset the uplink traffic to the external application;

the reset of the uplink traffic to the external application may include one of an immediate reset and a stepwise reset to the state before changing the uplink traffic;

the above processing may be implemented in a communication network control element configured to act as at least one of a gateway node, a policy and charging enforcement function, a traffic detection function and an application detection and control function, wherein the at least one communication element may include at least one of a terminal device or user equipment whose communication may be controlled by the communication network control element.

According to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to receive and process control information for selectively controlling a communication to an external application, the control information indicates to change an uplink traffic to the external application; and to apply a control for changing the uplink traffic to the external application on the basis of the control information.

Furthermore, according to an example of an embodiment, there is provided, for example a method including receiving and processing control information for selectively controlling a communication to an external application, the control information indicates to change an uplink traffic to the external application; and applying a control for changing the uplink traffic to the external application on the basis of the control information.

According to further refinements, these examples may include one or more of the following features:

the control information may be received due to an abnormal operation of the external application including at least one of a congestion state, an overload situation, a crash of an application and a crash of a third party server controlling the external application, wherein the abnormal operation of the external application may cause at least one of a delayed response time, a missing response from the external application, and a retransmission of a request;

the change of the uplink traffic to the external application may include a temporary limitation or stop of the uplink communication to the external application;

a communication network control element may be provided with information indicating specific capabilities of a communication element, wherein the control information may be related to the specific capabilities;

as the control for changing the uplink traffic to the external application, at least one of a suspension mechanism and a code processing mechanism may be applied, wherein the control information may include an indication to suspend or stop a specific part of the uplink communication related to the external application;

as the control for changing the uplink traffic to the external application, at least one filter for preventing uplink traffic related to the external application may be implemented, wherein the control information may include a setting or removing of at least one filter related to relevant bearers established to the external application;

an implementation of at least one filter for preventing uplink traffic related to the external application may consider at least one of whether or not a filter is already applied on a relevant bearer, and of whether or not other traffic being different to the traffic between the at least one communication element and the external application is communicated on the relevant bearer;

in case there is no filter applied on the relevant bearer and the other traffic is communicated on the relevant bearer, for controlling the communication to the external application, at least one uplink filter related to the other traffic may be set;

in case there is no filter applied on the relevant bearer and no other traffic is communicated on the relevant bearer, for controlling the communication to the external application, at least one uplink filter which fulfills formal requirements but leads to no destination may be set;

in case there is no filter applied on the relevant bearer and no other traffic is communicated on the relevant bearer, for controlling the communication to the external application, a complete blocking filter may be set;

in case there is no filter applied on the relevant bearer, for controlling the communication to the external application, at least one specific blocking filter for blocking at least one specified service data flow related to the external application may be set;

in case there is at least one filter applied on the relevant bearer, for controlling the communication to the external application, the at least one filter related to the external application may be removed;

the filter may include a traffic flow template filter;

as the control for changing the uplink traffic to the external application, a control of an internal application which communicates with the external application may be applied for preventing uplink traffic related to the external application, wherein the control information may include an indication to stop or suspend of the internal application;

control information may be received and processed for selectively controlling a communication to an external application, the control information may indicate to reset the uplink traffic to the external application, and a control for resetting the uplink traffic to the external application may be applied on the basis of the control information;

the reset of the uplink traffic to the external application may include one of an immediate reset and a stepwise reset to the state before changing the uplink traffic;

the above processing may be implemented in a communication element including at least one of a terminal device or user equipment whose communication may be controlled by a communication network control element acting as at least one of a gateway node, a policy and charging enforcement function, a traffic detection function and an application detection and control function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
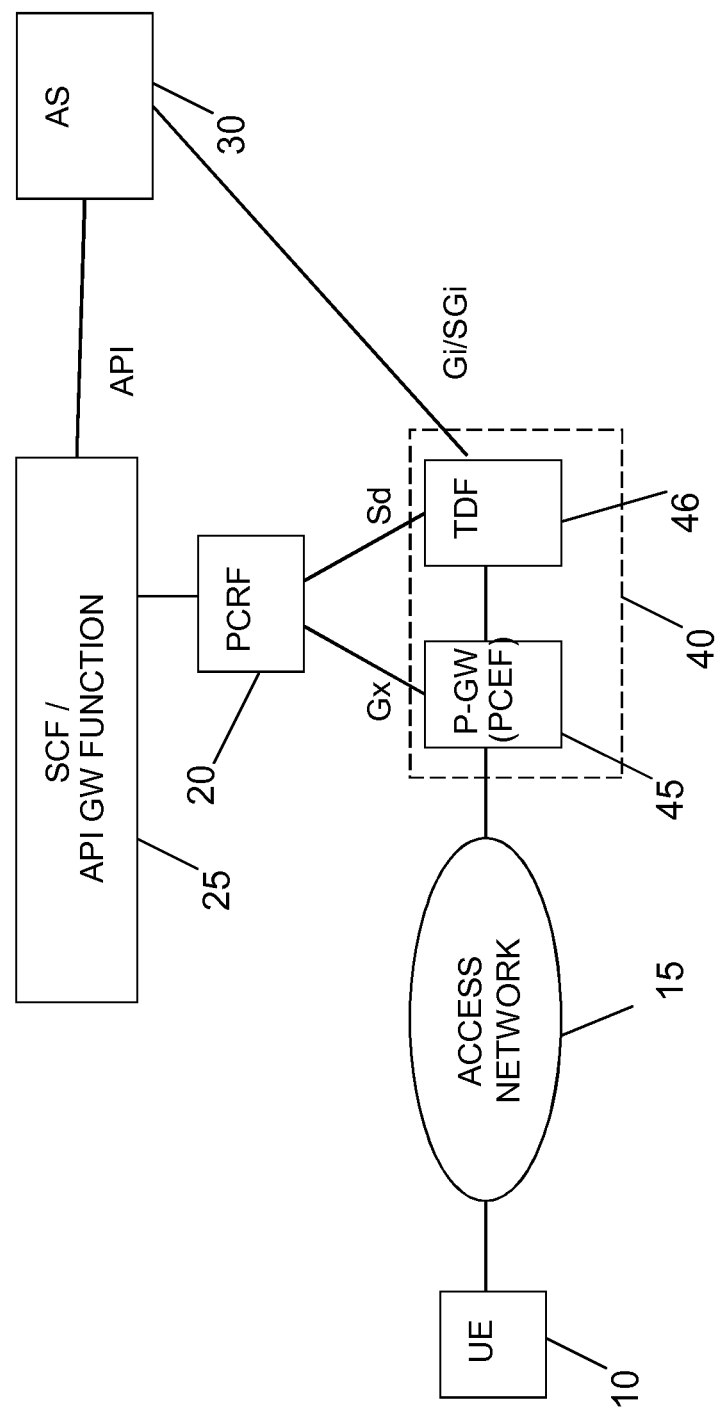
FIG. 1 shows a diagram illustrating a general architecture of a communication system where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), and fourth generation (4G) communication networks or enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Embodiments as well as principles described below are applicable to any communication element or terminal device, network element, relay node, server, node, corresponding component, and/or to any communication system or any combination of different communication systems that support required functionalities. The communication system may be a fixed communication system, a wireless communication system or a communication system utilizing both fixed networks and wireless networks. The protocols used, the specifications of communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on 3GPP standards, such as a third generation or fourth generation (like LTE or LTE-A) communication network, without restricting the embodiments to such an architecture, however. It is obvious for a person skilled in the art that the embodiments may also be applied to other kinds of communications networks having suitable means by adjusting parameters and procedures appropriately, e.g. WLAN or WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine to machine or D2D communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication element, such as a UE, a communication network control element, such as an eNB or gateway node like a P-GW or another core network element, and other elements of the same or other communication networks besides those described in detail herein below.

A communication network may also be able to communicate with other networks, such as a public switched telephone network or the Internet. The communication network may also be able to support the usage of cloud services. It should be appreciated that network elements of an access system, of a core network etc., and/or respective functionalities may be implemented by using any node, host, server or access node etc. entity suitable for such a usage.

Furthermore, the described network elements, such as communication elements, like a UE, communication network control elements, access network elements etc., like an eNB, core network elements, like an P-GW, TDF, PCEF etc., as well as corresponding functions as described herein, and other elements, functions or applications may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network element, network function, or of another entity of the communication network, such as of one or more of core network elements like a P-GW etc., may be performed in different entities or functions, such as in a node, host or server, in a flexible manner. In other words, a "division of labor" between involved network elements, functions or entities may vary case by case.

Communication networks, such as a 3GPP based system, have unique core assets, denoted as service capabilities, such as communications, context, subscription and control, which may be valuable to application providers. Communications refers to functions like voice calling, SMS, MMS, web browsing, streaming, etc. Subscription includes, for example, subscription identity, feature sets, preference. Context covers real-time user information such as location, presence, profile, device capabilities and data connection type. Control addresses functions like Quality of Service, policy and security.

Network operators may offer value added services by exposing these service capabilities to external application providers, businesses and partners using a suitable interface, such as a web based API. In addition, network operators may combine other internal or external services with their network capabilities to provide richer, composite API services to their partners. Thus, mobile network intelligence can be brought to applications.

Service capability exposure includes the identification and definition of service capabilities on the one hand and the exposure of the capabilities on the other hand. By means of service capability exposure, it is possible to provide authorized and secure access to service capabilities of the communication network and execution of services.

In order to expose service capabilities, for example, a concept referred to as AESE may be used by means of which communication network provided service capabilities are exposed to application providers, e.g. via OMA-API(s), allowing the API and the communication network, such as a 3GPP system, to act together to expose communication network service capabilities.

In this context, also mechanisms related to a service exposure and enablement support (SEES) are applicable by means of which third party services and the 3GPP network make each other aware of various capabilities and situations.

It is also conceivable to provide a mechanism which is also related to as application specific congestion control for data communication (ACDC). The target is that e.g. in disaster situations it is possible to free up network resources by prohibiting a communication initiation of particular applications in a UE.

A further approach is to enable a control of applications when e.g. a third party server or an external application encounter difficulties, which is also referred to as CATS.

Modern UEs, such as so-called smart phones, are able to run a plurality of application software (referred to hereinafter as "applications"). Such applications include, for example, a set of one or more programs designed to carry out operations for a specific task or application. Applications cannot run on themselves but are dependent on system software to execute. Examples of such application software include games, text processing, browsers, communication programs etc.

With the spread of applications on UEs, coupled with the rapidly growing number of UEs designed for usage with little or no human involvement (machine type communications), the potential for issues to occur in the overall "system" involving these applications and third party entities they interact with increases. When these third party systems experience difficulties, they may be able to manage their problems without undue impact on operator networks, but there will be times when they are not able to do so.

For example, when a third party server becomes congested or fails, the communication by the applications on the UEs that make use of that server may cause excessive use of network resources. It is to be noted that a third party server may be dedicated to a particular UE application or it may support multiple UE applications in one or more UEs.

It is a general goal to avoid, in case of an abnormal operation of a third party server or an external application running thereon an excessive use of network resources while at the same time it is desired to not affect other applications and their associated servers that are functioning normally.

For example, it is desirable that the communication network, such as the 3GPP network, is able to detect or receive an indication from a third party server of a congestion status or failure status and to selectively control individual applications on UEs when the 3GPP network becomes aware that a third party server or an external application has run into difficulties.

Currently, HTTP and other third party (possibly proprietary) protocols may be able to provide so-called status codes. However, such codes may not be sufficient as they may not provide a suitable indication to the application at the UE of the nature of the issue and therefore could result in frequent retries even when these will fail. Thus, the effect is an additional burdening of the network with connection attempts that will fail.

With regard to FIG. 1, a diagram illustrating a general architecture of a communication system is shown where some examples of embodiments are implementable. It is to be noted that the structure indicated in FIG. 1 shows only those devices, network elements and links which are useful for understanding principles underlying the examples of embodiments of the invention. As also known by those skilled in the art there may be several other network elements or devices involved in a communication in the communication system which are omitted here for the sake of simplicity.

In FIG. 1, a communication network is shown which forms a general basis of the example of a communication system according to some examples of embodiments. Specifically, as the network, a (wireless) communication network based for example on a 3GPP specification is provided. The communication network is configured to establish a communication connection to an external server, also referred to as a third party server, on which one or more external application are running. The external server may be part of the communication network or located in a second network such as an external service providing network or system, which may be located, for example, in a service cloud. It is to be noted that both the number of networks as well as the type thereof as depicted in FIG. 1 are merely intended to provide a basis for illustrating the principles of the control processing according to some examples of embodiments, while each one of the number and type of the involved network may be different to those shown in FIG. 1.

According to FIG. 1, reference sign 10 denotes a communication element, such as a UE, e.g. of a subscriber which represents one terminal point of a communication, i.e. from which UL data packets are transmitted and to which DL data packets are sent. Reference sign 15 denotes an access network via which the UE 10 is connected to the communication network. The access network comprises, for example, base stations, access nodes or the like.

Reference sign 40 denotes a communication network control element of a core network of the communication network, which comprises a gateway function acting as a gateway to an external side, such as a GGSN or a P-GW 45, and a traffic detection function (TDF) 46. It is to be noted that the TDF may be a standalone unit (in which case a separate interface, such as an Sd interface or reference point, is provided to a policy and charging rules function (to be described later)), or may be collocated as an ADC with a PCEF in the P-GW 45. P-GW/PCEF 45 and TDF 46 are configured to fulfill several functions, such as traffic detection for identifying and measuring (Internet) data traffic, including over-the-top services, policy enforcement for applying direct and indirect management to ensure optimal traffic flow, and charging enforcement.

Reference sign 20 denotes a policy and charging rules element or function, and reference sign 25 denotes an SCF/API GW function 25. The elements 20 and 25 are implemented for executing a corresponding processing. In this context, the SCF/API-GW function 25 is configured, for example, to hosts API framework functions, like providing the API(s) with secured, authenticated and authorized access to capabilities offered by the 3GPP system. The PCRF 20 represents, for example, an entity used for policy and QoS control for a converged network by 3GPP.

For connecting the communication network control element 40 and the PCRF 20, corresponding reference points or interfaces are to be provided. For example, as shown in the 3GPP system depicted in FIG. 1, a Gx interface is provided for transferring (QoS) policy and charging rules from PCRF to the PCEF in the P-GW 45. Furthermore, as indicated above, in case the TDF 46 is a standalone entity, an Sd interface is used between the TDF 46 and the PCRF 26.

Reference sign 30 denotes an AS on which an external application is running. The AS 30 includes, for example, an external-service providing control element including, gateway (GW) functions, router functions and the like. For example, the AS 30 is configured to manage and control respective applications such as programs, service functions etc., to receive and process service requests and data packets related to one or more applications, and to transmit information, responses, data packets etc. to the communication network. According to examples of embodiments, as interfaces between the AS 30 and the communication network, a management interface, such as an API interface, is established to and from the SCR/API-GW 25. Furthermore, a Gi/SGi reference point is used towards the communication network control element 40 (e.g. P-GW or GGSN). Gi/SGi represents the reference point between a GGSN or P-GW and a packet data network, such as an operator external public or private packet data network or an intra operator packet data network.

It is to be noted that even though FIG. 1 shows only one UE 10 and one AS 30, it is obvious that also other configurations are feasible. For example, more than one UE can be connected to one AS (or external application), while one UE 10 may be connected to more than one external application running on one AS or on a plurality of AS, for example.

According to examples of embodiments of the invention, an architecture, suitable control procedures and protocols will be described in the following allowing a control of a communication with an external application (for example a third party server or AS).

Generally, when taking the network structure shown in FIG. 1 as an illustrative example, and in case it is assumed that there occurs an abnormal operation at the AS 30 side, such as a congestion state, an overload situation, a crash of the external application or a total or partial crash of the AS 30, which causes e.g. at least one of a delayed response time, a missing response from the external application, and a retransmission of a request, examples of embodiments of the invention are related to avoid an excessive use of network resources while at the same time an operation of applications being different to the application having the abnormal operation and their associated servers (i.e. the elements which function normally) is tried to be not influenced. That is, according to examples of embodiments, measures are proposed which allow a detection of an indication from a third party server about an abnormal operation, and a suitable control at the UE side when the network becomes aware that a third party server or an external application has run into difficulties. It is to be noted that the following set of activities are applicable in various combinations within different examples of embodiments.

In a first phase, the P-GW/PCEF/TDF 40 finds out that there is a problem (i.e. an abnormal operation) with regard to an external application running on external AS 30 (for example, there is an overload or congestion situation or the application or AS is not available).

The P-GW/PCEF/TDF 40 may find out the presence of the problem in different ways.

For example, an indication is signaled by the AS 30, e.g. via API interface, to the 3GPP network, and further e.g. via PCRF 20 to the P-GW 45 (this example will be explained, for example, with regard to FIG. 2 described later).

As another possibility, the P-GW/PCEF/TDF (with ADC) 40 detects the problem by traffic monitoring, e.g. due to long response times of the AS 30 to application messages sent (by a UE/UEs) to the AS 30, or a UE/UEs (such as UE 10) is re-sending application messages due to no responses from the AS 30. In this case, the traffic monitoring element, such as TDF/ADC, informs the PCEF/P-GW about the detection of a problem related to an abnormal operation of the external application/AS 30. It is to be noted that depending on the structure of the P-GW/PCEF/TDF 40, this is a P-GW internal operation (i.e. when the ADC in collocated with PCEF in P-GW 45), or the standalone TDF 46 may inform the PCEF/P-GW 45, for example via the PCRF 20 (this example will be explained, for example, with regard to FIG. 3 described later) or directly e.g. on the user plane (for example, the related information may be transmitted by piggy-backing it on other data packets, such as user data or control message packets).

When the problem/abnormal operation is detected, the P-GW/PCEF/TDF 40 as the communication network control element decides to change the UL traffic from one or more UEs communicating with the external application or AS 30 where the problem is detected; for example, it is decided to limit the traffic from UEs to the problematic application/AS 30. In the processing for deciding the change of the UL traffic, also a selection processing may be included in which the communication network control element such as the P-GW/PCEF/TDF 40 selects which specific UL traffic is to be changed (to be limited or prohibited), which UE(s) are to be controlled (i.e. selection of UEs whose UL traffic is to be changed), which SDF(s) is/are involved in the UL traffic change, which applications (internal and/or external) are concerned, etc.

Basically, several approaches for a UL traffic control procedure are possible. However, the way how the UL traffic is changed, i.e. a specific control scheme related to the UL communication of a UE, may depend on properties of concerned application protocols, but also on capabilities of and supported by the related UEs.

For example, in case the detected application protocol supports a proper suspension mechanism or an error/cause/status code, the communication network control element such as the P-GW/PCEF/TDF 40 may apply the protocol mechanism and send relevant protocol messages to selected UEs (e.g. UE 10), which then cause the UEs to suspend or stop re-sending of application related messages via the network.

Alternatively or additionally, the communication network control element such as the P-GW/PCEF/TDF 40 may apply suitable filters, such as TFT filters, which are related to relevant bearers of selected UEs, to prevent UL traffic related to the problematic application/AS. Depending on the respective filter type, it may be possible that any other UL traffic from the UEs is still allowed.

Alternatively or additionally, the communication network control element such as the P-GW/PCEF/TDF 40 may control applications running on the UEs in question (i.e. internal applications), which communicate with the problematic external application or AS. Specifically, instructions or the like can be sent to the UEs in order to initiate a control of such internal applications to suspend or stop sending of application related messages via the network, i.e. to suspend or stop selected UL traffic to the external problematic application or the AS (that is, an application specific blocking is set). It is to be noted that this concept may require that the concerned UE is configured to apply such an application specific blocking. That is, this concept may be used, for example, only in case a UE has indicated beforehand a corresponding capability to the network (i.e. that it is configured to execute application specific blocking), e.g. upon an attach procedure. By means of this measure, the application specific UL traffic to the external application is prevented while other traffic is still allowed.

When applying, for example, a control scheme based on filters, such as TFT filters or other filter types, there are different ways conceivable how to use such filters for this purpose. The respective way may consider, for example, whether there are already any filters set or used in the communication (on relevant bearers) between the UE and the external application, and/or whether or not other traffic (i.e. traffic being not related to the problematic external application or AS) is present/detected on the relevant bearers.

For example, in case there are no (TFT) filters on the relevant/related bearer on which the application related UL traffic shall be prevented, but other (than the problematic application/AS related) traffic has also been detected on the bearer, the communication network control element such as the P-GW/PCEF/TDF 40 may send UL (TFT) filters related to the other detected traffic. This will effectively allow the other UL traffic but suspend/prevent the problematic application/AS related UL traffic on the bearer.

Alternatively or additionally, in case there are no (TFT) filters on the relevant/related bearer on which the application related UL traffic shall be prevented and no other (than the problematic application/AS related) traffic has also been detected on the bearer, the communication network control element such as the P-GW/PCEF/TDF 40 may send a formally correct UL (TFT) filter that leads to nowhere (i.e. there is no use for the filter by the UE). This will effectively suspend/prevent the problematic application/AS related UL traffic (actually all UL traffic) on the bearer.

Alternatively or additionally, in case there are no (TFT) filters on the relevant/related bearer on which the application related UL traffic shall be prevented and no other (than the problematic application/AS related) traffic has also been detected on the bearer, the communication network control element such as the P-GW/PCEF/TDF 40 may send a complete (uplink) blocking filter (e.g. a TFT filter which blocks everything). This will effectively suspend/prevent the problematic application/AS related UL traffic (actually all UL traffic) on the bearer. It is to be noted that this concept may require that the concerned UE is configured to apply such a filter. That is, this concept may be used, for example, only in case a UE has indicated beforehand a corresponding capability to the network, e.g. upon an attach procedure.

Alternatively or additionally, in case there are no (TFT) filters on the relevant/related bearer on which the application related UL traffic shall be prevented, a specific blocking filter concept may be applied by the communication network control element such as the P-GW/PCEF/TDF 40 by sending such a specific blocking filter. The specific blocking filter indicates, for example, an SDF that shall be suspended/blocked, i.e. in this case the UL SDF related to the problematic application/AS. It is to be noted that this concept may require that the concerned UE is configured to apply such a specific blocking filter. That is, this concept may be used, for example, only in case a UE has indicated beforehand a corresponding capability to the network, e.g. upon an attach procedure. However, the concept of using a specific blocking filter is further advantageous in that there is no impact at all on possible other applications which the user/UE may try to start during the suspension/prevention period related to the problematic application/AS (that is, selected UL traffic to the external problematic application or the AS is prevented while other traffic is allowed).

Alternatively or additionally, in case there are (TFT) filters on the relevant/related bearer on which the application related UL traffic shall be prevented, the communication network control element such as the P-GW/PCEF/TDF 40 may remove the uplink filter(s) related to the problematic application/AS. This will effectively allow the other UL traffic but prevent the problematic application/AS related UL traffic (i.e. selected UL traffic) on the bearer.

It is to be noted that in case there are several users/UEs connected to the problematic external application/AS, the users/UEs may be prioritized. Such a prioritization may originate from subscription data and may be provided to the communication network control element such as the P-GW/PCEF/TDF 40 by the PCRF 20, e.g. within PCC rules and/or IP-CAN session authorization. In case of a prioritization of users, the communication network control element such as the P-GW/PCEF/TDF 40 is configured, for example, to start changing the UL traffic (e.g. limiting/preventing the UL traffic) to the problematic application/AS first beginning at users/UEs having a lower priority level.

According to further examples, the control procedure considers also the case when the situation related to an abnormal operation of the external application/AS is over. For example, when a corresponding indication from the AS 30 is received, or it is detected by the TDF/ADC that the abnormal operation is not present anymore, the communication network control element such as the P-GW/PCEF/TDF 40 initiates a processing to re-establish the previous UL communication, for example by restoring the original filters. The processing is executed for application sessions which are regarded as being still valid, i.e. which are not terminated or stopped. Furthermore, the re-establishment of the previous UL traffic state may be effected in such a manner that the previous state is immediately reset, or a stepwise change to the previous traffic state is conducted, e.g. in order to avoid a sudden increase of traffic.

In the following, referring to FIGS. 2 and 3, operations of the communication system being based, for example, in the above described examples of embodiments are discussed in further detail.

Figure 2:
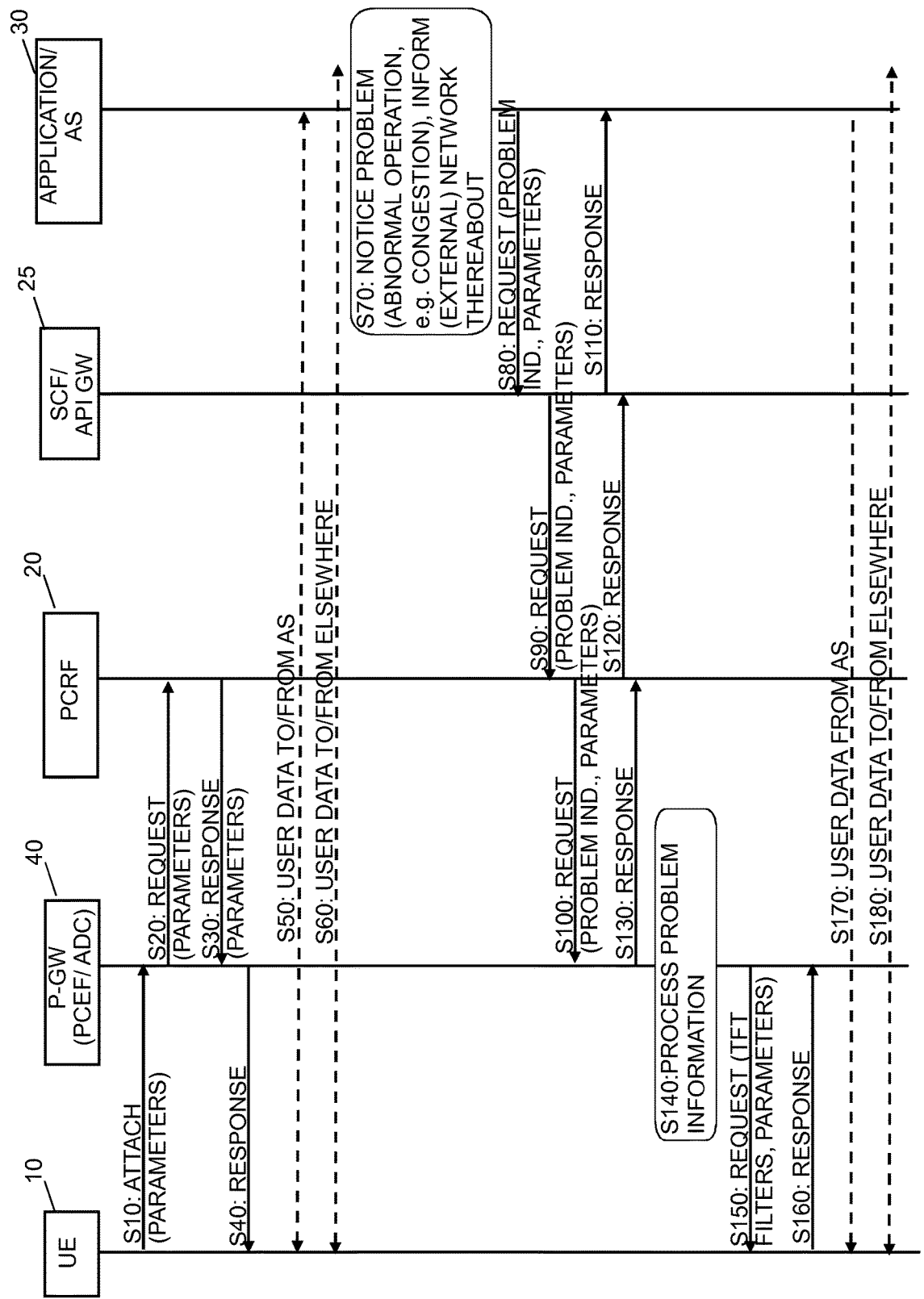
FIG. 2 shows a signaling diagram illustrating a processing according to some examples of embodiments.

FIG. 2 shows a signaling diagram illustrating a corresponding control processing according to some examples of embodiments which correspond to the above described procedure. Specifically, FIG. 2 is related to a processing according to the above described example wherein an UL traffic control at the UE is conducted while the abnormal operation is detected due to an indication from the AS side. It is to be noted that the signaling partners indicated in FIG. 2 are related, for example, to the elements shown in FIG. 1.

In S10, UE 10 conducts an attach procedure to the communication network by sending an attach message. The attach message in S10 comprises, for example, also an indication or parameters related to specific capabilities of the network supported by the UE, such as the capability to operate with specific filters, like a complete or specific blocking filter, a capability to support application specific blocking or the like, as described above.

The communication network control element such as the P-GW/PCEF/TDF 40 sends in S20, when receiving the attach message from the UE 10, a request message to the PCRF 20, which includes the parameters of the attach message in S10.

The PCRF 20 responds in S30 to the request of S20, wherein the communication network control element such as the P-GW/PCEF/TDF 40 sends a response to the UE 10 in S40 in order to complete the attach procedure.

Then, user data communication between the UE 10 and an external application at the AS 30 is established (S50), while it is also possible that a used data communication between the UE 10 and another source is established (S60).

In S70, the AS 30 notices that there is a problem with the external application, i.e. an abnormal operation is detected (for example congestion, a crash etc.). Therefore, a corresponding information or indication is sent to the communication network (which may be an external network for the AS 30).

In detail, in S80, a request message is sent to the network, e.g. via the API interface to the SCF/API-GW 25, wherein the request message includes a problem indication and also corresponding parameters.

The request message is forwarded in S90 by the SCF/API-GW 25 to the PCRF 20, which in turn forwards the request message in S100 to the communication network control element such as the P-GW/PCEF/TDF 40. The respective request messages in S80, S90 and S100 are responded, respectively, in S110, S120 and S130.

As an alternative to sending the problem indication by means of a request signaling in S80 and S90 via the SCF/API-GW 25, the AS 30 may also be configured to send a corresponding indication directly to the communication network control element such as the P-GW/PCEF/TDF 40, for example on the user plane e.g. by piggy-backing the indication in transmitted data packet, such as user data or application protocol control message/packet. In this case, the communication network control element such as the P-GW/PCEF/TDF 40 is configured to identify the piggy-backed indication and to process it accordingly.

In S140, the communication network control element such as the P-GW/PCEF/TDF 40 processes the request message of S100, i.e. the problem indication, and decides to change the UL traffic to the problematic application/AS 30. This includes, for example, a selection of measures to be taken for UL traffic control, wherein also received capability information of the UE 10 may be considered. For changing the UL traffic, in S150, a request message is sent to the UE 10 which causes that the UL traffic is changed. Only as one of the various examples described above for suitable control concepts, a set of TFT filters is sent to the UE 10 which are applied to prevent UL traffic via related bearers to the external application.

In S160, the UE 10, having received the request in S150, responds to the communication network control element such as the P-GW/PCEF/TDF 40, e.g. confirms that the measures instructed are applied (e.g. TFT filters are set, or the like).

Then, in S170, user data may be still received from the external application but (selected or all) UL traffic is prohibited. On the other hand, depending on the selected traffic control concept, user data traffic to and from another source is still possible (S180).

Even though it is not explicitly disclosed in FIG. 2, a similar processing is conducted in case the UL traffic limitation is reset to the state according to S50, for example. In this case, when an indication from the AS 30 is received that the abnormal operation is terminated, corresponding requests leading to a change of the UL traffic at the UE 10 can be provided in a similar manner, including also a corresponding processing at the communication network control element such as the P-GW/PCEF/TDF 40.

According to further examples of embodiments, it is also possible to change the UL traffic in a temporary manner. That is, the UL traffic change can be reset to the previous state upon request (as described above) or after elapse of a specified time, for example.

Figure 3:
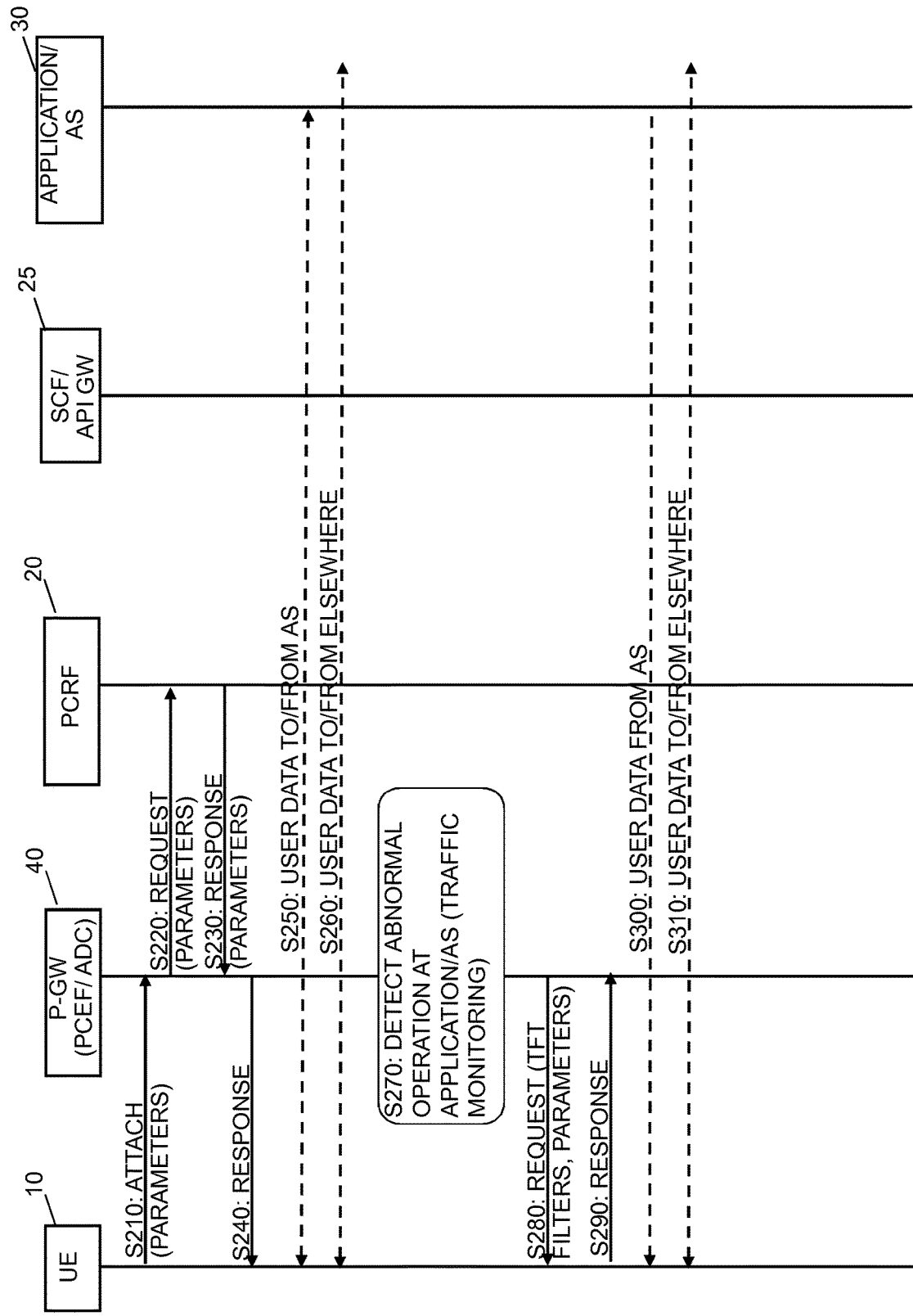
FIG. 3 shows a signaling diagram illustrating a processing according to some examples of embodiments.

Next, with regard to FIG. 3, a signaling diagram illustrating a corresponding control processing according to some examples of embodiments is shown which correspond to the above described procedure. Specifically, FIG. 3 is related to a processing according to the above described example wherein an UL traffic control at the UE is conducted while the abnormal operation is detected by the network, e.g. by traffic monitoring. It is to be noted that the signaling partners indicated in FIG. 3 are related, for example, to the elements shown in FIG. 1.

In S210, UE 10 conducts an attach procedure to the communication network by sending an attach message. The attach message in S210 comprises, for example, also an indication or parameters related to specific capabilities of the network supported by the UE, such as the capability to operate with specific filters, like a complete or specific blocking filter, a capability to support application specific blocking or the like, as described above.

The communication network control element such as the P-GW/PCEF/TDF 40 sends in S220, when receiving the attach message from the UE 10, a request message to the PCRF 20, which includes the parameters of the attach message in S210.

The PCRF 20 responds in S230 to the request of S220, wherein the communication network control element such as the P-GW/PCEF/TDF 40 sends a response to the UE 10 in S240 in order to complete the attach procedure.

Then, user data communication between the UE 10 and an external application at the AS 30 is established (S250), while it is also possible that a used data communication between the UE 10 and another source is established (S260).

In S270, the communication network control element such as the P-GW/PCEF/TDF 40 detects, e.g. in a traffic monitoring procedure, that there is a problem with the external application, i.e. an abnormal operation is detected (for example congestion, a crash etc.). Therefore, the communication network control element such as the P-GW/PCEF/TDF 40 decides to change the UL traffic to the problematic application/AS 30. This includes, for example, a selection of measures to be taken for UL traffic control, wherein also received capability information of the UE 10 may be considered.

For changing the UL traffic, in S280, a request message is sent to the UE 10 which causes that the UL traffic is changed. Only as one of the various examples described above for suitable control concepts, a set of TFT filters is sent to the UE 10 which are applied to prevent UL traffic via related bearers to the external application.

In S290, the UE 10, having received the request in S280, responds to the communication network control element such as the P-GW/PCEF/TDF 40, e.g. confirms that the measures instructed are applied (e.g. TFT filters are set, or the like).

Then, in S300, user data may be still received from the external application but (selected or all) UL traffic is prohibited. On the other hand, depending on the selected traffic control concept, user data traffic to and from another source is still possible (S310).

Even though it is not explicitly disclosed in FIG. 3, a similar processing is conducted in case the UL traffic limitation is reset to the state according to S250, for example. In this case, when the communication network control element such as the P-GW/PCEF/TDF 40 detects that the abnormal operation is terminated, a corresponding request to the UE 10 leading to a change of the UL traffic at the UE 10 can be provided in a similar manner.

According to further examples of embodiments, it is also possible to change the UL traffic in a temporary manner. That is, the UL traffic change can be reset to the previous state upon request (as described above) or after elapse of a specified time, for example.

Figure 4:
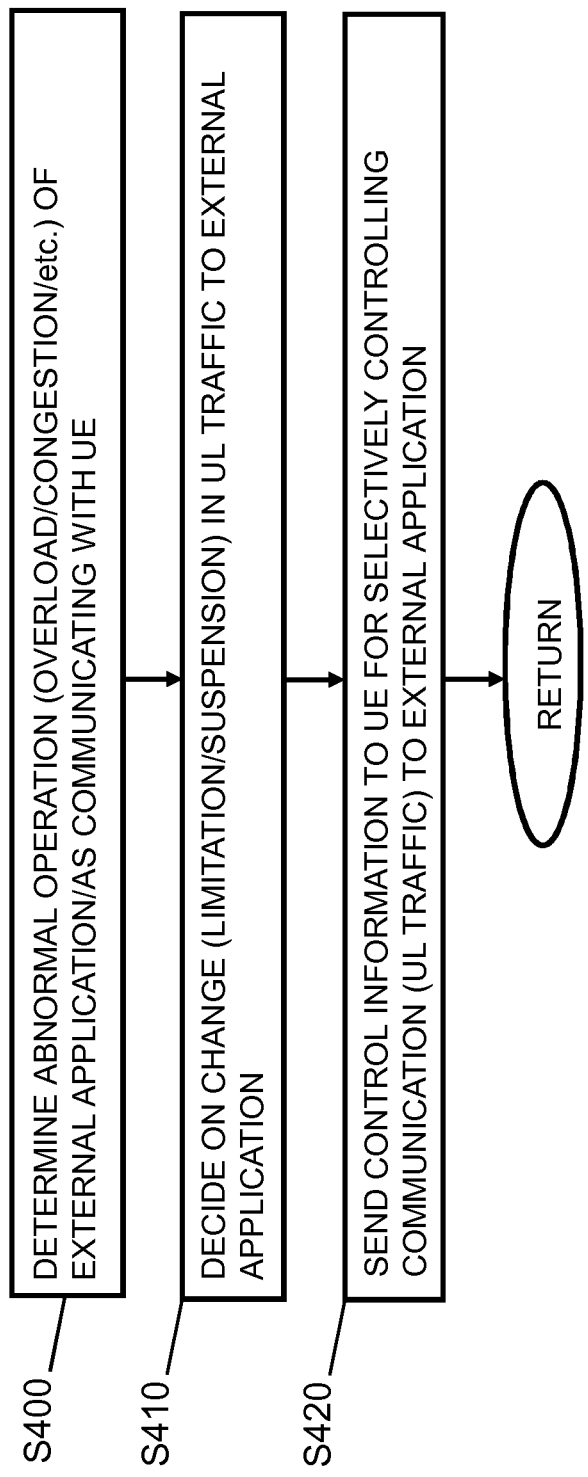
FIG. 4 shows a flow chart of a processing conducted in a communication network control element or function according to some examples of embodiments.

FIG. 4 shows a flow chart of a processing conducted in a communication network control element, such as the P-GW/PCEF/TDF element 40, according to some examples of embodiments. Specifically, the example according to FIG. 4 is related to a control procedure conducted by the communication network control element, function or node acting as a P-GW in the communication network as depicted e.g. in FIG. 1.

In S400, it is determined whether there is an abnormal operation (caused by e.g. congestion, overload etc.) of an external application or the AS 30 with which at least one UE (i.e. UE 10) being controlled by the communication network control element has established a communication connection (i.e. bearers etc.). For example, the abnormal operation of the external application or AS is related to a congestion state, an overload situation, a (partial or total) crash of the external application or of the AS etc., so that e.g. one or more of a delayed response time, a missing response from the external application, a retransmission of a request or the like is caused.

According to examples of embodiments, the abnormal operation of the external application or AS 30 may be determined in different manner. For example, an indication from the external application or the AS (as a third party server) controlling the external application is received (directly e.g. by means of piggy-backing or via other nodes like SCF/API-GW) and processed. The indication indicates a problem at the external application side. Alternatively or additionally, the communication network control element conducts a communication monitoring processing (traffic monitoring or the like) for detecting an operational performance of the external application or the AS 30. On the basis of this detection, it is then judged whether an abnormal operation of the external application/AS is present (e.g. by means of a comparison of a detection result with a threshold, a communication pattern, or the like).

In S410, it is decided whether a change of an UL traffic to the external application is required. The change of the UL traffic to the external application includes, for example, a temporary limitation or a stop of the UL communication from the UE to the external application (i.e. the AS 30).

In S420, a control processing is conducted for selectively control the communication of the UE 10 to the external application. For this purpose, control information for the UE 10 is provided, wherein the control information reflect the decision regarding the change of the UL traffic to the external application.

According to some examples of embodiments, it is possible to consider, for selectively controlling the communication of the UE 10, specific capabilities of the UE 10 (if known). The specific capabilities concern, for example, a UE configuration that enables the UE 10 to apply certain filters types or to support application specific measures (such as application specific blocking) according to agreed or given scenarios, as described above.

According to some examples of embodiments, a suspension mechanism and/or a code processing mechanism are used for selectively controlling the communication of the UE 10. In this case, the control information provided to the UE 10 includes an indication to the UE 10 to suspend or stop a specific part of the UL communication related to the external application.

Alternatively, according to some examples of embodiments, in order to selectively control the communication of the UE 10, one or more filters, such as TFT filters, may be implemented for preventing UL traffic related to the external application. In this case, the control information provided to the UE 10 includes an instruction for setting or removing of at least one filter related to relevant bearers between the UE 10 and the external application.

In this case, according to some examples of embodiments, when the implementation of one or more filters for preventing UL traffic related to the external application is used, it is considered whether or not any filter is already applied on a relevant bearer. Alternatively or additionally, it is considered whether or not other traffic (i.e. traffic being different to the traffic between the UE 10 and the external application) is communicated on the relevant bearer.

Depending on these considerations, according to some examples of embodiments, one of the following processing may be conducted.

For example, in case there is no filter applied on the relevant bearer and other traffic is communicated on the relevant bearer, at least one UL filter (e.g. TFT filter) related to the other traffic is set in order to selectively control the communication of the UE 10. Thus, the other traffic is still allowed while UL traffic to the external application is prevented.

As another example, in case there is no filter applied on the relevant bearer and no other traffic is communicated on the relevant bearer, one or more UL filters (e.g. TFT filters) are set for selectively controlling the communication of the UE 10, wherein the one or more UL filters fulfill formal requirements for corresponding filters but leads to no destination. Thus, the UL traffic to the external application is prevented.

As still another example, in case there is no filter applied on the relevant bearer and no other traffic is communicated on the relevant bearer, a complete blocking filter is set for selectively controlling the communication of the UE 10. For such a complete blocking filter, it may be required that the UE 10 is specifically configured, so that according to some examples of embodiments this is used only in case the corresponding capability of the UE 10 is known. By means of this measure, the UL traffic to the external application is prevented.

As still another example, in case there is no filter applied on the relevant bearer, one or more specific blocking filters for blocking at least one specified SDF (i.e. the SDF related to the external application) is set for selectively controlling the communication of the UE 10. For such a specific blocking filter, it may be required that the UE 10 is specifically configured, so that according to some examples of embodiments this is used only in case the corresponding capability of the UE 10 is known. By means of this measure, the selected UL traffic to the external application is prevented while other traffic is still allowed.

As still another example, in case there is at least one filter (e.g. TFT filter) applied on the relevant bearer, the at least one filter related to the external application is removed for selectively controlling the communication of the UE 10. By means of this measure, the selected UL traffic to the external application is prevented while other traffic is still allowed.

Alternatively, according to some examples of embodiments, in order to selectively control the communication of the UE 10, a control of an internal application of the UE 10 which communicates with the external application is conducted for preventing selected UL traffic related to the external application. In this case, the control information provided to the UE 10 includes an indication to stop or suspend the internal application of the UE 10, i.e. to block the internal application or the like. For such an application specific blocking, according to some examples of embodiments, it may be required that the UE 10 is specifically configured, so that this is used only in case the corresponding capability of the UE 10 is present. By means of this measure, the application specific UL traffic to the external application is prevented while other traffic is still allowed.

According to further examples of embodiments, in case there are more communication elements (e.g. UEs not shown in FIG. 1) than just UE 10 which have established a communication connection with the external application, it is recognized whether there is any prioritizing of the respective communication elements or UEs. If this is the case, an order of the communication elements/UEs based on the prioritizing is considered when deciding on a change of the UL traffic to the external application and selectively controlling the communication of the UEs.

Then, the processing may return. For example, in a further processing, the termination of the abnormal operation may be detected allowing to reset the UL traffic. Specifically, according to examples of embodiments, it may be determined (e.g. after the change of the UL traffic is completed) that the abnormal operation of the external application with which the UE 10 has established the communication connection is terminated. In this situation, it is decided to do a reset of the UL traffic to the external application (i.e. the previous state of the UL traffic is re-established, for example). Then, a control procedure to selectively control the communication of the UE 10 to the external application is conducted by providing control information for the UE 10 reflecting the decision to reset the UL traffic to the external application. According to examples of embodiments, the control for resetting the UL traffic to the external application may be done in such a manner that either an immediate reset to the previous state is instructed, or that a stepwise reset to the previous state is conducted.

Figure 5:
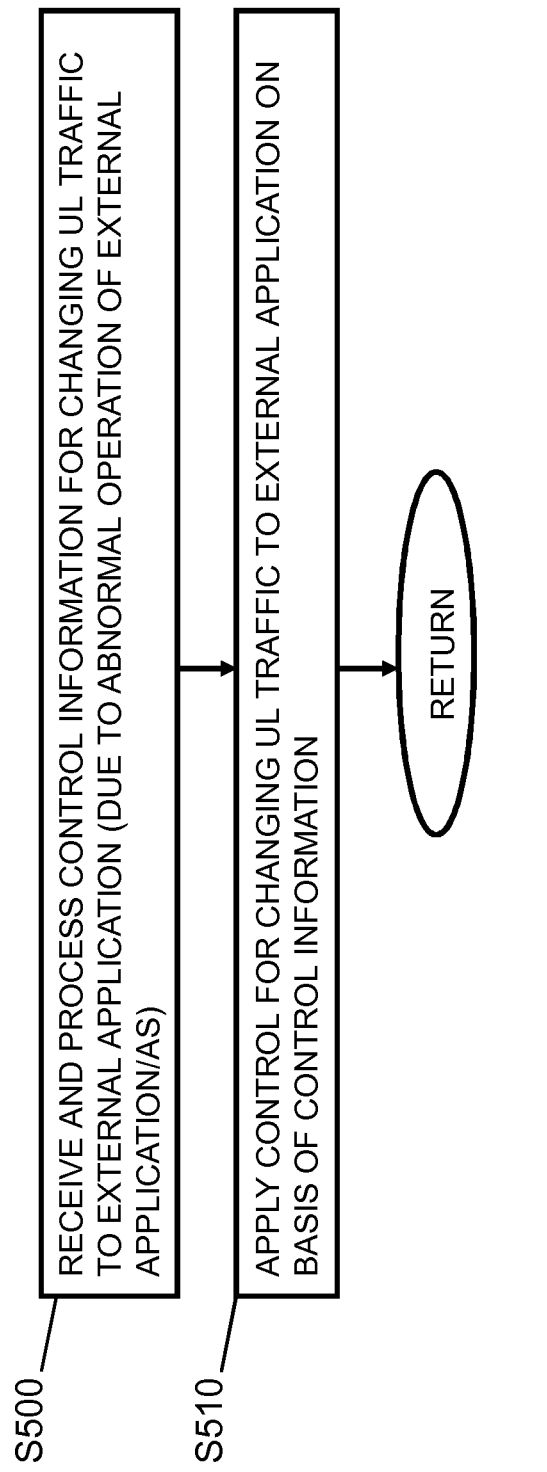
FIG. 5 shows a flow chart of a processing conducted in a communication element according to some examples of embodiments.

FIG. 5 shows a flow chart of a processing conducted in a communication element, such as the UE 10, according to some examples of embodiments. Specifically, the example according to FIG. 5 is related to a control procedure conducted by the UE 10 having established a communication connection (e.g. bearers etc.) with the external application/AS 30 as depicted e.g. in FIG. 1.

In S500, control information for selectively controlling a communication to an external application is received and processed. For example, the control information (sent from a communication network control element such as PGW 40) indicates to change an UL traffic to the external application. The change of the UL traffic to the external application includes, for example, a temporary limitation or stop of the UL communication to the external application (i.e. the AS 30).

According to some examples of embodiments, the control information is received due to an abnormal operation of the external application or AS 30. For example, the abnormal operation of the external application or AS is related to a congestion state, an overload situation, a (partial or total) crash of the external application or of the AS etc., so that e.g. one or more of a delayed response time, a missing response from the external application, a retransmission of a request or the like is caused.

According to some examples of embodiments, a communication network control element (such as PGW 40) may be provided with information indicating specific capabilities of the UE 10, wherein the control information is related to the specific capabilities. The specific capabilities concern, for example, a UE configuration that enables the UE 10 to apply certain filters types or to support application specific measures (such as application specific blocking) according to agreed or given scenarios, as described above.

In S510, a control for changing the UL traffic to the external application on the basis of the control information is applied.

According to some examples of embodiments, a suspension mechanism and/or a code processing mechanism are applied as the control for changing the UL traffic. In this case, the control information includes an indication to suspend or stop a specific part of the UL communication related to the external application.

Alternatively, according to some examples of embodiments, in order to control the change of the UL traffic, one or more filters, such as TFT filters, are implemented for preventing UL traffic related to the external application. In this case, the control information includes an instruction for setting or removing at least one filter related to relevant bearers between the UE 10 and the external application.

In this case, according to some examples of embodiments, when the implementation of one or more filters for preventing UL traffic related to the external application is used, it is considered whether or not any filter is already applied on a relevant bearer. Alternatively or additionally, it is considered whether or not other traffic (i.e. traffic being different to the traffic between the UE 10 and the external application) is communicated on the relevant bearer.

Depending on these considerations, according to some examples of embodiments, one of the following processing may be conducted.

For example, in case there is no filter applied on the relevant bearer and other traffic is communicated on the relevant bearer, at least one UL filter (e.g. TFT filter) related to the other traffic is set in order to control the communication to the external application/AS 30. Thus, the other traffic is still allowed while UL traffic to the external application is prevented.

As another example, in case there is no filter applied on the relevant bearer and no other traffic is communicated on the relevant bearer, one or more UL filters (e.g. TFT filters) are set for controlling the communication to the external application/AS 30, wherein the one or more UL filters fulfill formal requirements for corresponding filters but leads to no destination. Thus, the UL traffic to the external application is prevented.

As still another example, in case there is no filter applied on the relevant bearer and no other traffic is communicated on the relevant bearer, a complete blocking filter is set for controlling the communication to the external application/AS 30. According to examples of embodiments, for such a complete blocking filter, it may be required that the UE 10 is specifically configured, so that this is used only in case the corresponding capability of the UE 10 is present. By means of this measure, the UL traffic to the external application is prevented.

As still another example, in case there is no filter applied on the relevant bearer, one or more specific blocking filters for blocking at least one specified SDF (i.e. the SDF related to the external application) is set for controlling the communication to the external application/AS 30. For such a specific blocking filter, according to some examples of embodiments, it may be required that the UE 10 is specifically configured, so that this is used only in case the corresponding capability of the UE 10 is present. By means of this measure, the UL traffic to the external application is prevented while other traffic is still allowed.

As still another example, in case there is at least one filter (e.g. TFT filter) applied on the relevant bearer, the at least one filter related to the external application is removed for controlling the communication to the external application/AS 30. By means of this measure, the UL traffic to the external application is prevented while other traffic is still allowed.

Alternatively, according to some examples of embodiments, in order to control the change of the UL traffic, a control of an internal application which communicates with the external application is conducted for preventing UL traffic related to the external application. In this case, the control information includes an indication to stop or suspend the internal application in the UE 10, i.e. to block the internal application or the like. For such an application specific blocking, according to some examples of embodiments, it may be required that the UE 10 is specifically configured, so that this is used only in case the corresponding capability of the UE 10 is present. By means of this measure, the application specific UL traffic to the external application is prevented while other traffic is still allowed.

Then, the processing may return. For example, in a further processing (e.g. after the change of the UL traffic is completed), the abnormal operation of the external application may be terminated allowing to reset the UL traffic. Specifically, according to examples of embodiments, control information for selectively controlling a communication to the external application is received and processed wherein here the control information indicates to reset the UL traffic to the external application (i.e. the previous state of the UL traffic is re-established, for example). Then, a corresponding control for resetting the UL traffic to the external application is applied on the basis of the control information. According to examples of embodiments, the control for resetting the UL traffic to the external application may be done in such a manner that either an immediate reset to the previous state is executed, or that a stepwise reset to the previous state is conducted.

Figure 6:
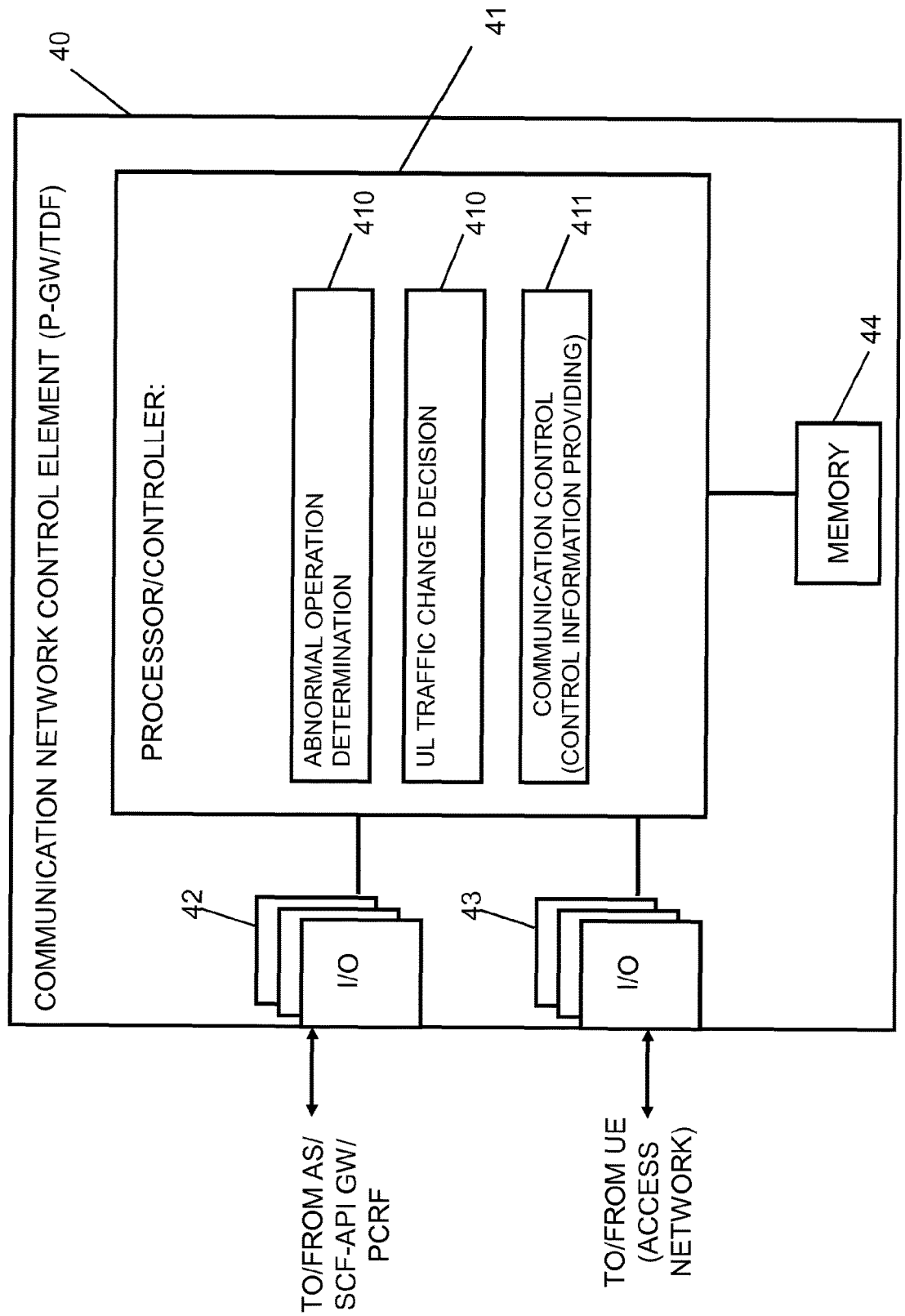
FIG. 6 shows a diagram of a network element acting as a communication network control element or function according to some examples of embodiments.

FIG. 6 shows a diagram of a communication network control element according to some examples of embodiments, which is configured to implement a control procedure as described in connection with some of the examples of embodiments. It is to be noted that the communication network control element, like the P-GW/PCEF/TDF 40, which is shown in FIG. 6, may include further elements or functions besides those described herein below. Furthermore, even though reference is made to a communication network control element or node, the element or node may be also another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 6 may include a processing circuitry, a processing function, a control unit or a processor 41, such as a CPU or the like, which is suitable for executing instructions given by programs or the like related to the control procedure. The processor 41 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 42 and 43 denote transceiver or input/output (I/O) units or functions (interfaces) connected to the processor or processing function 41. The I/O units 42 may be used for communicating with a other network elements, such as the PCRF 20 or the SCF API GW 25, the AS 30 etc. The I/O units 43 may be used for communicating with a communication element, such as UE 10, e.g. via the access network 15. The I/O units 42 and 43 may be a combined unit including communication equipment towards several network elements, or may include a distributed structure with a plurality of different interfaces for different network elements. Reference sign 44 denotes a memory usable, for example, for storing data and programs to be executed by the processor or processing function 41 and/or as a working storage of the processor or processing function 41. It is to be noted that the memory 44 may be implemented by using one or more memory portions of the same or different type of memory.

The processor or processing function 41 is configured to execute processing related to the above described control procedure. In particular, the processor or processing circuitry or function 41 includes one or more of the following sub-portions. Sub-portion 410 is a processing portion which is usable for determining an abnormal operation of an external application/AS. The portion 410 may be configured to perform processing according to S400 of FIG. 5. Furthermore, the processor or processing circuitry or function 41 may include a sub-portion 411 usable as a portion for deciding on an UL traffic change. The portion 411 may be configured to perform a processing according to S410 of FIG. 5. In addition, the processor or processing circuitry or function 41 may include a sub-portion 412 usable as a portion for conducting a communication control e.g. by providing control information. The portion 412 may be configured to perform a processing according to S420 of FIG. 5.

Figure 7:
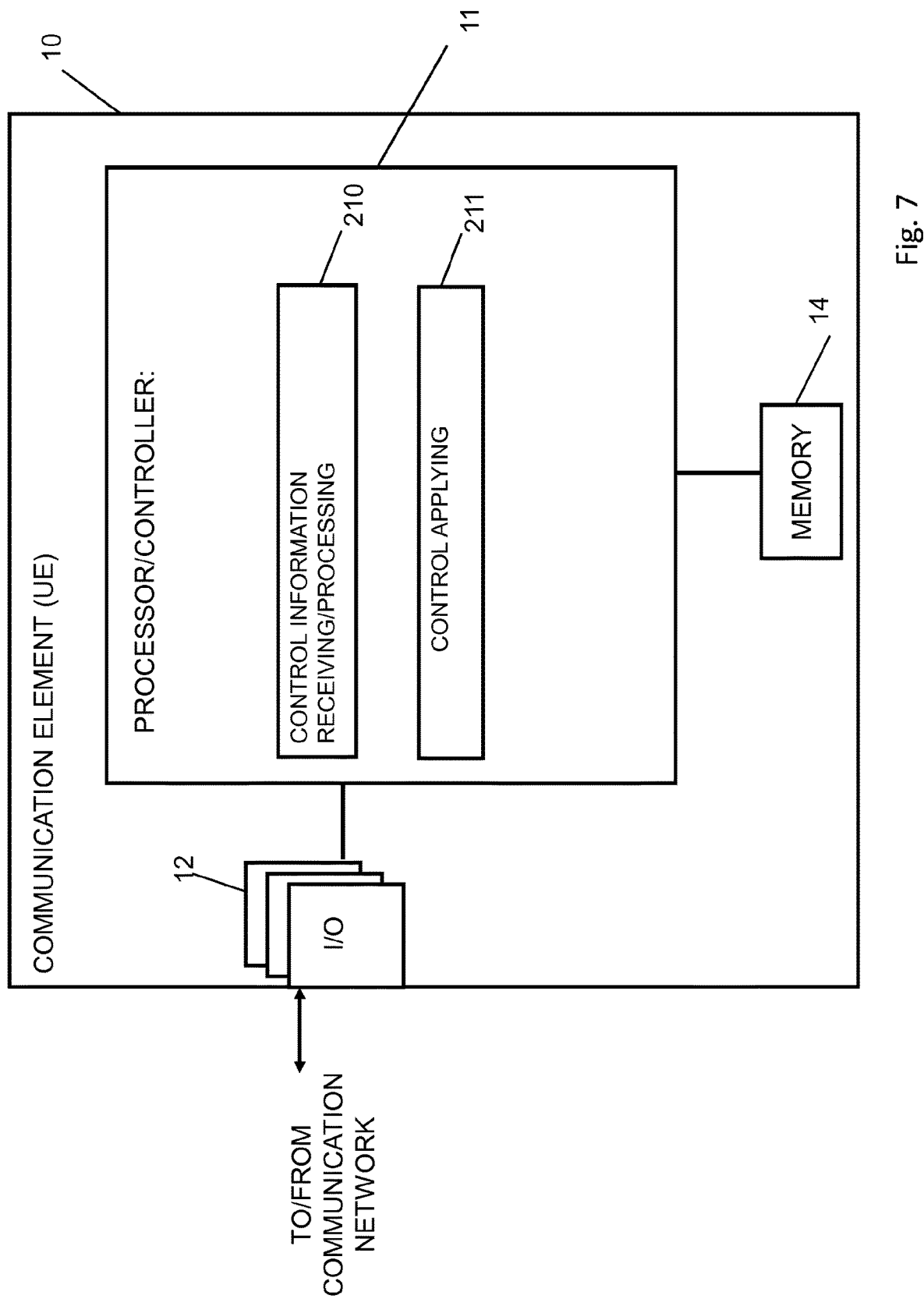
FIG. 7 shows a diagram of a communication element according to some examples of embodiments.

FIG. 7 shows a diagram of a communication element such as the UE 10 according to some examples of embodiments, which is configured to implement a control procedure as described in connection with some of the examples of embodiments. It is to be noted that the communication element, like the UE 10, which is shown in FIG. 7, may include further elements or functions besides those described herein below. Furthermore, even though reference is made to a communication element or node, the element or node may be also another device or function having a similar task, such as a chipset, a chip, a module, an application etc., which can also be part of a communication element or attached as a separate element to a communication element, or the like. It should be understood that each block and any combination thereof may be implemented by various means or their combinations, such as hardware, software, firmware, one or more processors and/or circuitry.

The communication element or UE 10 shown in FIG. 7 may include a processing circuitry, a processing function, a control unit or a processor 11, such as a CPU or the like, which is suitable for executing instructions given by programs or the like related to the control procedure. The processor 11 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 12 denotes transceiver or input/output (I/O) units or functions (interfaces) connected to the processor or processing function 11. The I/O units 12 may be used for communicating with a communication network, such as a communication network control element like the PGW/PCEF/TDF 40 (via the access network 15). The I/O units 12 may be a combined unit including communication equipment towards several network elements, or may include a distributed structure with a plurality of different interfaces for different network elements. Reference sign 14 denotes a memory usable, for example, for storing data and programs to be executed by the processor or processing function 11 and/or as a working storage of the processor or processing function 11. It is to be noted that the memory 14 may be implemented by using one or more memory portions of the same or different type of memory.

The processor or processing function 11 is configured to execute processing related to the above described control procedure. In particular, the processor or processing circuitry or function 11 includes one or more of the following sub-portions. Sub-portion 110 is a processing portion which is usable for receiving and processing control information. The portion 110 may be configured to perform processing according to S500 of FIG. 6. Furthermore, the processor or processing circuitry or function 11 may include a sub-portion 111 usable as a portion for applying a control. The portion 111 may be configured to perform a processing according to S510 of FIG. 6.

By means of the measures described above, it is possible to control communication to a problematic application or AS so as to avoid an excessive use of network resources while at the same time it is possible to not affect other applications and their associated servers that are functioning normally. Specifically, when an abnormal operation such as a congestion status, failure status or the like, is detected, individual UEs and/or applications on the UEs can be selectively controlled. For example, by means of the above described measures, it is possible to avoid overloading/message flood problems caused by UEs when an external application server/AS has problems.

It is to be noted that the measures described above can be used either separately or in various combinations. For example, measures being related to at least two of the suspension mechanism, the code processing mechanism, the filter mechanism and the application control mechanism can be used in parallel with each other for one and the same UE or for different UEs. Also different control concepts, such as at least two of the above described filter concepts, can be used in parallel with each other for one and the same UE or for different UEs.

It is to be noted that some or all of the examples of embodiments described above may be applied to a partly or fully virtualized environment comprising one or more VNFs.

According to another example of embodiments, there is provided an apparatus including means for determining an abnormal operation of an external application with which at least one communication element has established a communication connection; means for deciding on a change of an uplink traffic to the external application; and means for selectively controlling a communication of the at least one communication element to the external application by providing control information for the at least one communication element, the control information reflecting the decision to change the uplink traffic to the external application.

According to another example of embodiments, there is provided an apparatus including means for receiving and processing control information for selectively controlling a communication to an external application, the control information indicates to change an uplink traffic to the external application; and means for applying a control for changing the uplink traffic to the external application on the basis of the control information.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user equipment may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smart phone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus including
at least one processing circuitry,
and
at least one memory for storing instructions to be executed by the processing circuitry, wherein
the at least one memory and the instructions are configured to, with the at least one processing circuitry, cause the apparatus at least:
to determine an abnormal operation of an external application with which at least one communication element has established a communication connection;
to decide on a change of an uplink traffic to the external application; and
to selectively control, at the at least one communication element, a communication of the at least one communication element to the external application by providing control information for the at least one communication element, the control information reflecting the decision to change the uplink traffic to the external application.

2. The apparatus according to claim 1, wherein the at least one memory and the instructions are further configured to, with the at least one processing circuitry, cause the apparatus at least:
to determine the abnormal operation of the external application by at least one of
receiving and processing an indication from the external application or a third party server controlling the application indicating a problem at the external application side, and
detecting, from a communication monitoring, a performance of operation of the external application and judging an abnormal operation of the external application from the detection result.

3. The apparatus according to claim 1, wherein the abnormal operation of the external application includes at least one of a congestion state, an overload situation, a crash of an application and a crash of a third party server controlling the external application, wherein the abnormal operation of the external application causes at least one of a delayed response time, a missing response from the external application, and a retransmission of a request.

4. The apparatus according to claim 1, wherein the change of the uplink traffic to the external application includes a temporary limitation or stop of the uplink communication from the at least one communication element to the external application.

5. The apparatus according to claim 1, wherein the at least one memory and the instructions are further configured to, with the at least one processing circuitry, cause the apparatus at least:
to consider, for selectively controlling the communication of the at least one communication element, specific capabilities of the at least one communication element.

6. The apparatus according to claim 1, wherein the at least one memory and the instructions are further configured to, with the at least one processing circuitry, cause the apparatus at least:
to use, for selectively controlling the communication of the at least one communication element, at least one of a suspension mechanism and a code processing mechanism, wherein the control information provided to the at least one communication element includes an indication to the communication element to suspend or stop a specific part of the uplink communication related to the external application.

7. The apparatus according to claim 1, wherein the at least one memory and the instructions are further configured to, with the at least one processing circuitry, cause the apparatus at least:
to use, for selectively controlling the communication of the at least one communication element, an implementation of at least one filter for preventing uplink traffic related to the external application, wherein the control information provided to the at least one communication element includes a setting or removing of at least one filter related to relevant bearers between the at least one communication element and the external application.

8. The apparatus according to claim 7, wherein the at least one memory and the instructions are further configured to, with the at least one processing circuitry, cause the apparatus at least:

in case there is at least one filter applied on the relevant bearer, to remove, for selectively controlling the communication of the at least one communication element, the at least one filter related to the external application.

9. The apparatus according to claim 1, wherein the at least one memory and the instructions are further configured to, with the at least one processing circuitry, cause the apparatus at least:
to recognize, in case the at least one communication element having established a communication connection with the external application includes more than one communication element, whether or not a prioritizing of the communication elements is set, and
to consider an order of communication elements based on the prioritizing when deciding on a change of an uplink traffic to the external application and selectively controlling the communication of the communication elements.

10. The apparatus according to claim 1, wherein the at least one memory and the instructions are further configured to, with the at least one processing circuitry, cause the apparatus at least:
to determine that the abnormal operation of the external application with which the at least one communication element has established a communication connection is terminated;
to decide on a reset of the uplink traffic to the external application; and
to selectively control the communication of the at least one communication element to the external application by providing control information for the at least one communication element, the control information reflecting the decision to reset the uplink traffic to the external application, wherein the reset of the uplink traffic to the external application includes one of an immediate reset and a stepwise reset to the state before changing the uplink traffic.

11. A method including
determining an abnormal operation of an external application with which at least one communication element has established a communication connection;
deciding on a change of an uplink traffic to the external application; and
controlling selectively, at the at least one communication element, a communication of the at least one communication element to the external application by providing control information for the at least one communication element, the control information reflecting the decision to change the uplink traffic to the external application.

12. The method according to claim 11, further including determining the abnormal operation of the external application by at least one of
receiving and processing an indication from the external application or a third party server controlling the application indicating a problem at the external application side, and
detecting, from a communication monitoring, a performance of operation of the external application and judging an abnormal operation of the external application from the detection result.

13. The method according to claim 11, wherein the abnormal operation of the external application includes at least one of a congestion state, an overload situation, a crash of an application and a crash of a third party server controlling the external application, wherein the abnormal operation of the external application causes at least one of a delayed response time, a missing response from the external application, and a retransmission of a request.

14. The method according to claim 11, wherein the change of the uplink traffic to the external application includes a temporary limitation or stop of the uplink communication from the at least one communication element to the external application.

15. The method according to claim 11, further including considering, for selectively controlling the communication of the at least one communication element, specific capabilities of the at least one communication element.

16. The method according to claim 11, further including using, for selectively controlling the communication of the at least one communication element, at least one of a suspension mechanism and a code processing mechanism, wherein the control information provided to the at least one communication element includes an indication to the communication element to suspend or stop a specific part of the uplink communication related to the external application.

17. The method according to claim 11, further including using, for selectively controlling the communication of the at least one communication element, an implementation of at least one filter for preventing uplink traffic related to the external application, wherein the control information provided to the at least one communication element includes a setting or removing of at least one filter related to relevant bearers between the at least one communication element and the external application.

18. The method according to claim 17, further including in case there is at least one filter applied on the relevant bearer, removing, for selectively controlling the communication of the at least one communication element, the at least one filter related to the external application.

19. The method according to claim 11, further including recognizing, in case the at least one communication element having established a communication connection with the external application includes more than one communication element, whether or not a prioritizing of the communication elements is set, and
considering an order of communication elements based on the prioritizing when deciding on a change of an uplink traffic to the external application and selectively controlling the communication of the communication elements.

20. The method according to claim 11, further including determining that the abnormal operation of the external application with which the at least one communication element has established a communication connection is terminated;
deciding on a reset of the uplink traffic to the external application; and
control selectively the communication of the at least one communication element to the external application by providing control information for the at least one communication element, the control information reflecting the decision to reset the uplink traffic to the external application, wherein the reset of the uplink traffic to the external application includes one of an immediate reset and a stepwise reset to the state before changing the uplink traffic.

21. An apparatus including
at least one processing circuitry, and
at least one memory for storing instructions to be executed by the processing circuitry, wherein the at least one memory and the instructions are configured to, with the at least one processing circuitry, cause the apparatus at least:
to receive and process control information for selectively controlling, at the apparatus, a communication to an external application, the control information indicates to change an uplink traffic to the external application; and
to apply a control for changing the uplink traffic to the external application on the basis of the control information.

22. The apparatus according to claim 21, wherein the change of the uplink traffic to the external application includes a temporary limitation or stop of the uplink communication to the external application.

23. The apparatus according to claim 21, wherein the at least one memory and the instructions are further configured to, with the at least one processing circuitry, cause the apparatus at least:
to provide a communication network control element with information indicating specific capabilities of a communication element, wherein the control information is related to the specific capabilities.

24. The apparatus according to claim 21, wherein the at least one memory and the instructions are further configured to, with the at least one processing circuitry, cause the apparatus at least:
to implement, as the control for changing the uplink traffic to the external application, at least one filter for preventing uplink traffic related to the external application, wherein the control information includes a setting or removing of at least one filter related to relevant bearers established to the external application.

25. The apparatus according to claim 24, wherein an implementation of at least one filter for preventing uplink traffic related to the external application, considers at least one of whether or not a filter is already applied on a relevant bearer, and of whether or not other traffic being different to the traffic between the at least one communication element and the external application is communicated on the relevant bearer.

26. The apparatus according to claim 25, wherein the at least one memory and the instructions are further configured to, with the at least one processing circuitry, cause the apparatus at least:
in case there is no filter applied on the relevant bearer and the other traffic is communicated on the relevant bearer, to set, for controlling the communication to the external application, at least one uplink filter related to the other traffic.

27. The apparatus according to claim 25, wherein the at least one memory and the instructions are further configured to, with the at least one processing circuitry, cause the apparatus at least:
in case there is at least one filter applied on the relevant bearer, to remove, for controlling the communication to the external application, the at least one filter related to the external application.

28. The apparatus according to claim 21, wherein the at least one memory and the instructions are further configured to, with the at least one processing circuitry, cause the apparatus at least:
to receive and process control information for selectively controlling a communication to an external application, the control information indicates to reset the uplink traffic to the external application; and
to apply a control for resetting the uplink traffic to the external application on the basis of the control information, wherein the reset of the uplink traffic to the external application includes one of an immediate reset and a stepwise reset to the state before changing the uplink traffic.

* * * * *